US011370566B2

(12) United States Patent
Testoni et al.

(10) Patent No.: US 11,370,566 B2
(45) Date of Patent: Jun. 28, 2022

(54) SYSTEM FOR TRANSFERRING A GROUP OF COMPONENTS OF ELECTRONIC CIGARETTES FROM A FIRST OPERATING STATION TO A SECOND OPERATING STATION

(71) Applicant: G.D S.p.A., Bologna (IT)

(72) Inventors: Luca Testoni, Castel Maggiore (IT); Luca Lanzarini, Crespellano (IT); Francesco Renco, Castel Maggiore (IT); Luca Mariani, Cesena (IT); Mirco Legnani, Casalecchio di Reno (IT); Massimo Sartoni, Bologna (IT); Luca Federici, Bologna (IT)

(73) Assignee: G.D S.P.A., Bologna (IT)

( * ) Notice: Subject to any disclaimer, the term of this patent is extended or adjusted under 35 U.S.C. 154(b) by 265 days.

(21) Appl. No.: 16/617,413

(22) PCT Filed: May 30, 2018

(86) PCT No.: PCT/IB2018/053840
§ 371 (c)(1),
(2) Date: Nov. 26, 2019

(87) PCT Pub. No.: WO2018/220547
PCT Pub. Date: Dec. 6, 2018

(65) Prior Publication Data
US 2020/0178610 A1    Jun. 11, 2020

(30) Foreign Application Priority Data

Jun. 1, 2017   (IT) ........................ 102017000060052

(51) Int. Cl.
*B65G 47/82*    (2006.01)
*B65B 5/06*    (2006.01)
(Continued)

(52) U.S. Cl.
CPC .............. *B65B 5/068* (2013.01); *A24F 40/70* (2020.01); *B65G 47/082* (2013.01); *B65G 47/82* (2013.01)

(58) Field of Classification Search
CPC .......... A24C 5/326; A24C 5/35; B65B 5/068; A24F 40/70; B65G 47/082; B65G 47/82; B65G 19/02; B65G 47/26; B65G 47/265
See application file for complete search history.

(56) References Cited

U.S. PATENT DOCUMENTS 3,262,243 A * 7/1966 Molins ................... A24C 5/354
                                                                53/150
5,035,315 A * 7/1991 Fukusaki ............. B65G 47/082
                                                              198/419.2

(Continued)

FOREIGN PATENT DOCUMENTS

DE    4433808 A1    3/1996
GB    1056841 A    2/1967

OTHER PUBLICATIONS

International Search Report and Written Opinion dated Jul. 31, 2018 for counterpart International Patent Application Mo. PCT/IB2018/053840.

*Primary Examiner* — Gregory W Adams
(74) *Attorney, Agent, or Firm* — Shuttleworth & Ingersoll, PLC; Timothy J. Klima

(57) ABSTRACT

A system for transferring a first group of components of electronic cigarettes from first to second operating stations includes a flat collecting surface extending from a feeding zone to a releasing zone. A feeding device receives the components and feeds them onto the collecting surface. A first abutment element abuts the first component of the first group. A second abutment element abuts the last component of the first group. A compacting and stabilizing device moves the components closer together and stabilizes their (Continued)

positions. A first movement device moves the first and second abutment elements along the collecting surface to transfer the first group to the releasing zone. A tray faces the releasing zone to receive the first group. A pushing device pushes the components from the releasing zone into the tray. A transferring device transfers the tray with the first group towards the second operating station.

11 Claims, 17 Drawing Sheets

(51) Int. Cl.
*A24F 40/70* (2020.01)
*B65G 47/08* (2006.01)

(56) References Cited

U.S. PATENT DOCUMENTS

| | | | |
|---|---|---|---|
| 7,066,317 B2* | 6/2006 | Iwasa | B65B 35/40 |
| | | | 198/431 |
| 7,581,634 B2* | 9/2009 | Hart | B65G 47/52 |
| | | | 198/418.6 |
| 2016/0145050 A1* | 5/2016 | Tegtmeier | B65H 29/14 |
| | | | 700/218 |

* cited by examiner

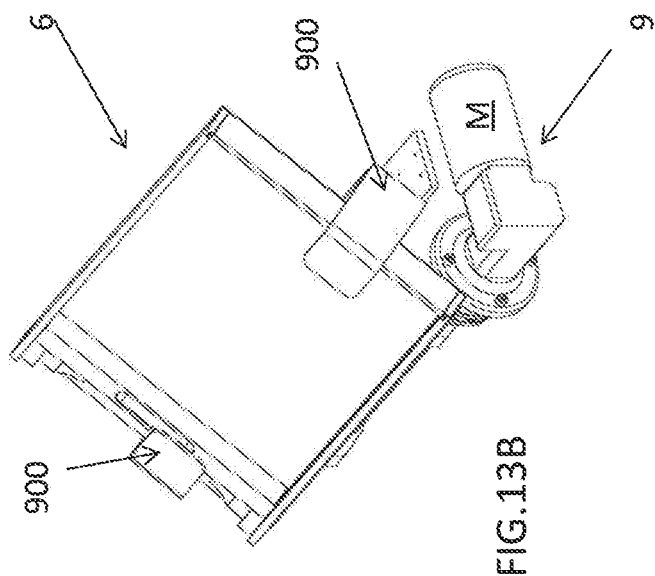
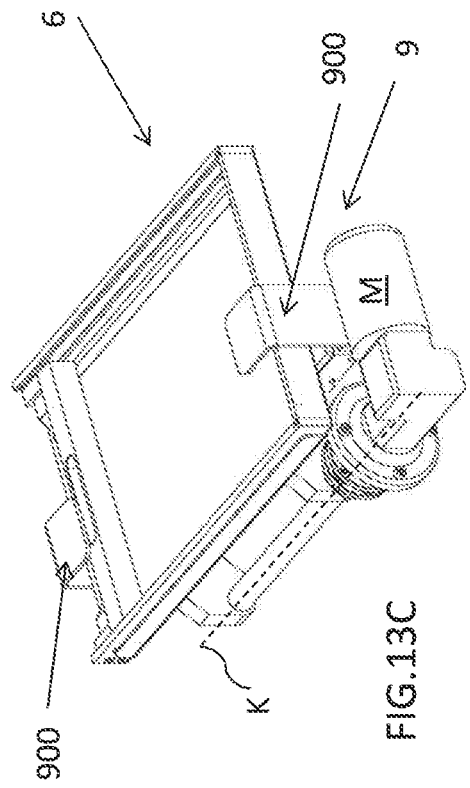
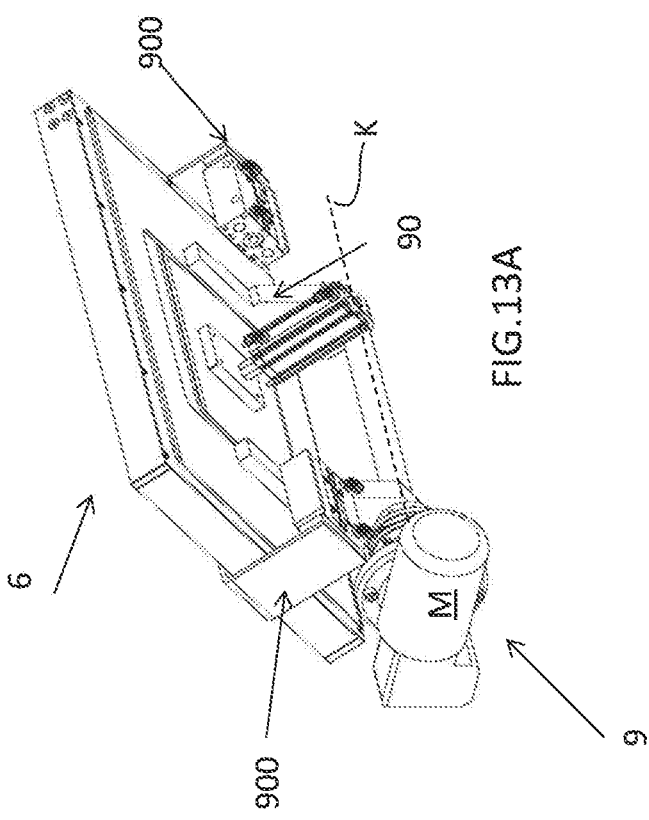
FIG.13A
FIG.13B
FIG.13C

SYSTEM FOR TRANSFERRING A GROUP OF COMPONENTS OF ELECTRONIC CIGARETTES FROM A FIRST OPERATING STATION TO A SECOND OPERATING STATION

This application is the National Phase of International Application PCT/IB2018/053840 filed May 30, 2018 which designated the U.S.

This application claims priority to Italian Patent Application No. 102017000060052 filed Jun. 1, 2017, which application is incorporated by reference herein.

TECHNICAL FIELD

This invention addresses the technical field of electronic cigarettes. More specifically, the invention relates to a system for transferring a group of components of electronic cigarettes from a first operating station to a second operating station.

BACKGROUND ART

As is known, electronic cigarettes are made up of different components which are assembled to each other.

Recently, the production of electronic cigarettes is becoming more and more automated; in particular, automatic stations are dedicated to operations which differ greatly from each other: for example, assembling the electronic components, filling the cartridges with the liquid to be vaporized, inspecting the assembled groups, etc.

Thus, the operating stations are often located in different rooms, that is to say, they are not usually in line. This gives rise to the need to transfer the groups of components from one operating station to another.

Unlike traditional cigarettes, the components of electronic cigarettes are not easy to transfer, not only on account of their shape but also because of the material they are made of, which in some of the components, is characterized by a low friction coefficient.

DISCLOSURE OF THE INVENTION

This invention has for an aim to overcome the drawbacks described above.

This aim is achieved by proposing a system for transferring a group of components of electronic cigarettes from a first operating station to a second operating station according to the accompanying claims.

Advantageously, the proposed system overcomes the above mentioned disadvantages of the prior art by guaranteeing controlled transfer of the electronic cigarette components of any shape and/or material.

BRIEF DESCRIPTION OF THE DRAWINGS

Further aims are more apparent in the specification which follows, with reference to the accompanying drawings, in which:

FIGS. 13A-13C are perspective views of a detail of the invention in three different operating situations;

DETAILED DESCRIPTION OF PREFERRED EMBODIMENTS OF THE INVENTION

Figure 1:
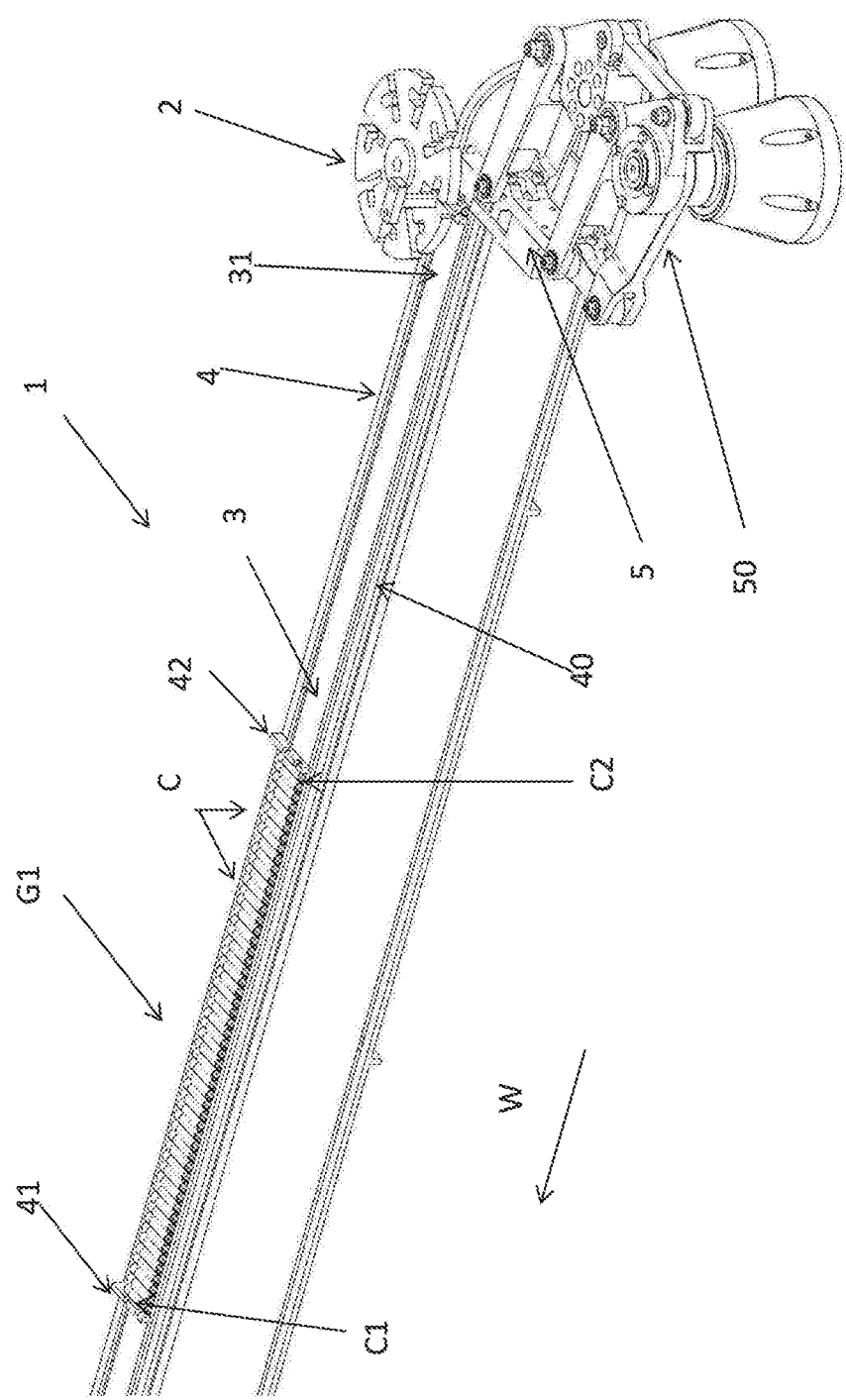
FIG. 1 shows a partial perspective view of a system for transferring a group of components of electronic cigarettes from a first operating station to a second operating station according to this invention, in a first operating situation.

With reference to the accompanying drawings, the reference numeral 1 denotes a system for transferring at least a first group G1 of components C of electronic cigarettes from a first operating station to a second operating station.

By way of non-limiting example, the components C are cartridges of electronic cigarettes. Alternatively, the components may be components other than the cartridges or they may be complete electronic cigarettes. Also by way of example, the first operating station (not illustrated) is a cartridge assembly station and the second operating station (also not illustrated) is a cartridge filling station. In another alternative embodiment, the first operating station and the second operating station are both assembly stations where electronic cigarette components are assembled.

The system 1 according to the invention comprises: a flat collecting surface 3 extending along a longitudinal direction from a feeding zone 31 to a releasing zone 32, downstream of the feeding zone 31; and a feeding device 2 that receives the components C from the first operating station one by one and feeds them one by one onto the flat collecting surface 3 in the feeding zone 31 at a first mutual distance from each other.

Figure 2:
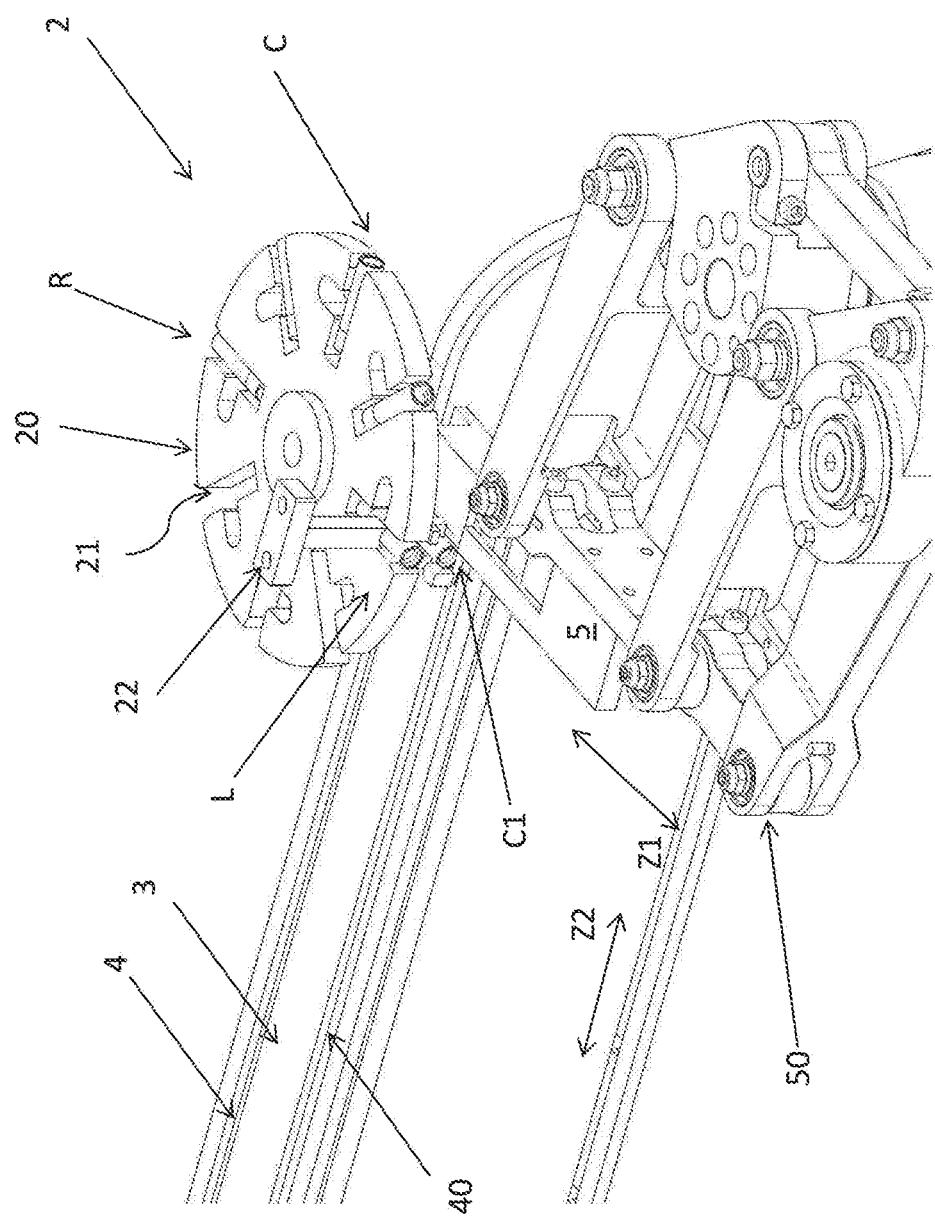
FIG. 2 illustrates an enlarged detail of the system of FIG. 1 in a second operating situation.
Figure 3:
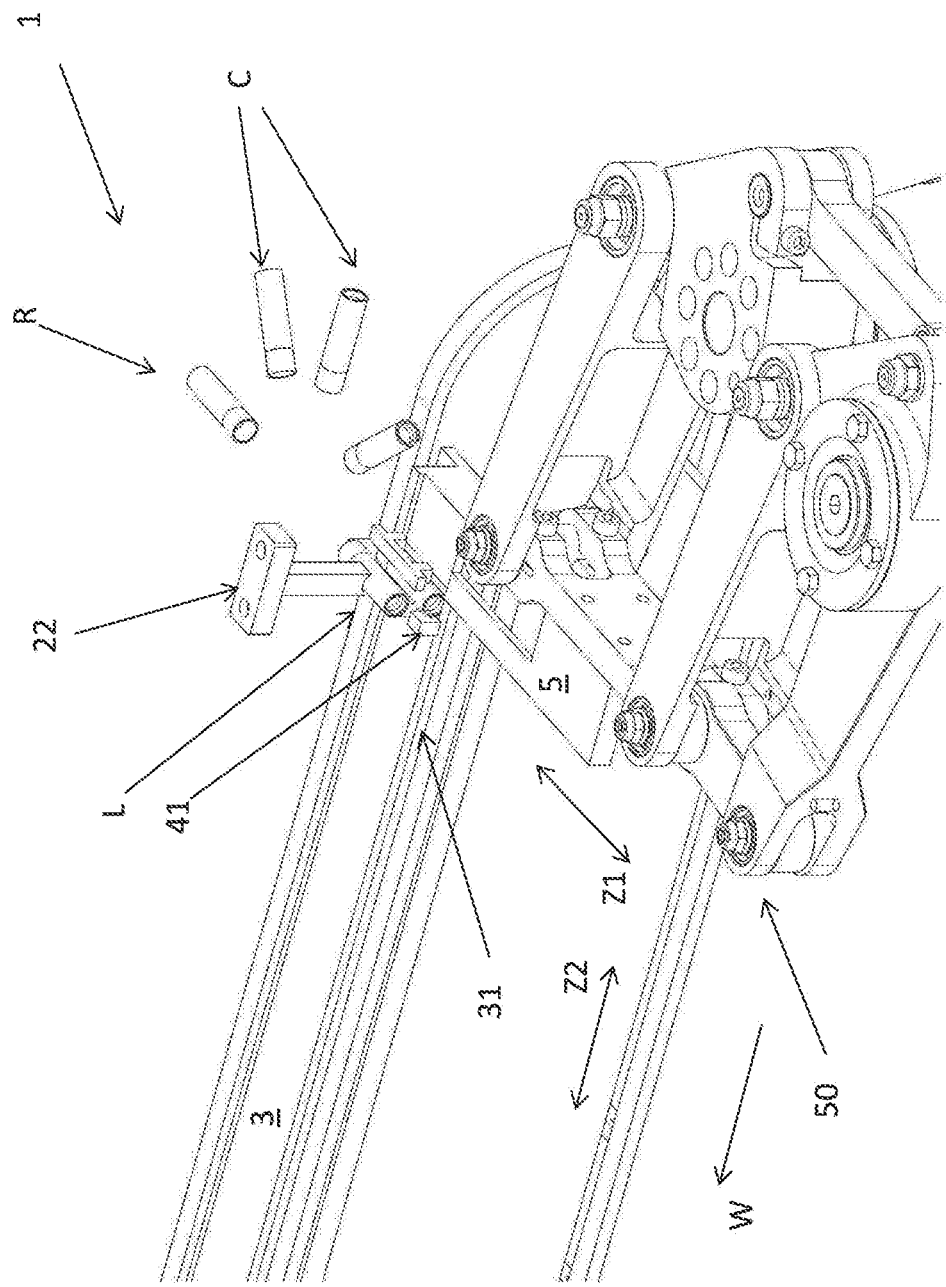
FIG. 3 is a view like that of FIG. 2 but with some parts cut away in order to better illustrate others.
Figure 4:
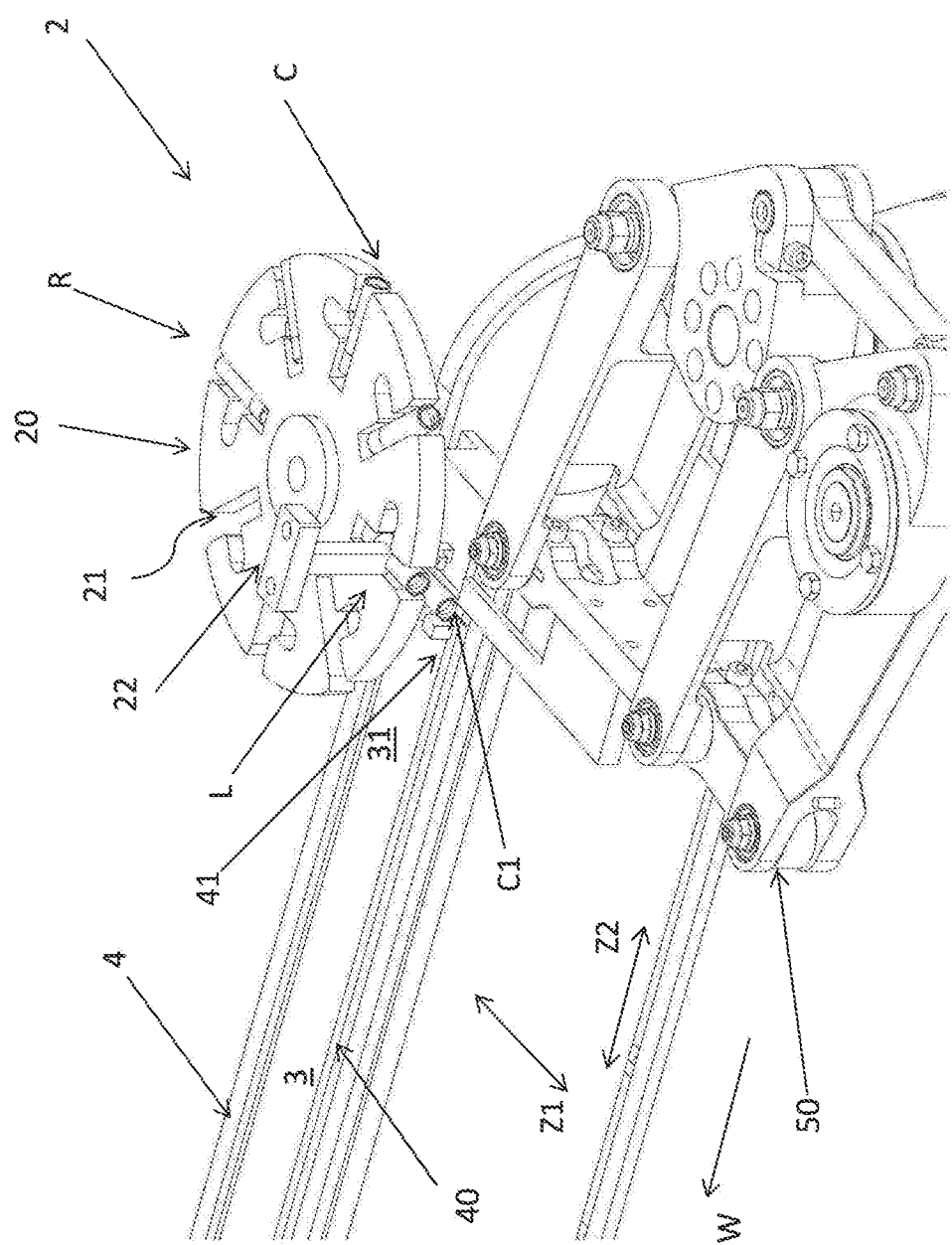
FIG. 4 and FIG. 5 are views like those of FIG. 2 and FIG. 3, respectively, but in a third operating situation.
Figure 5:
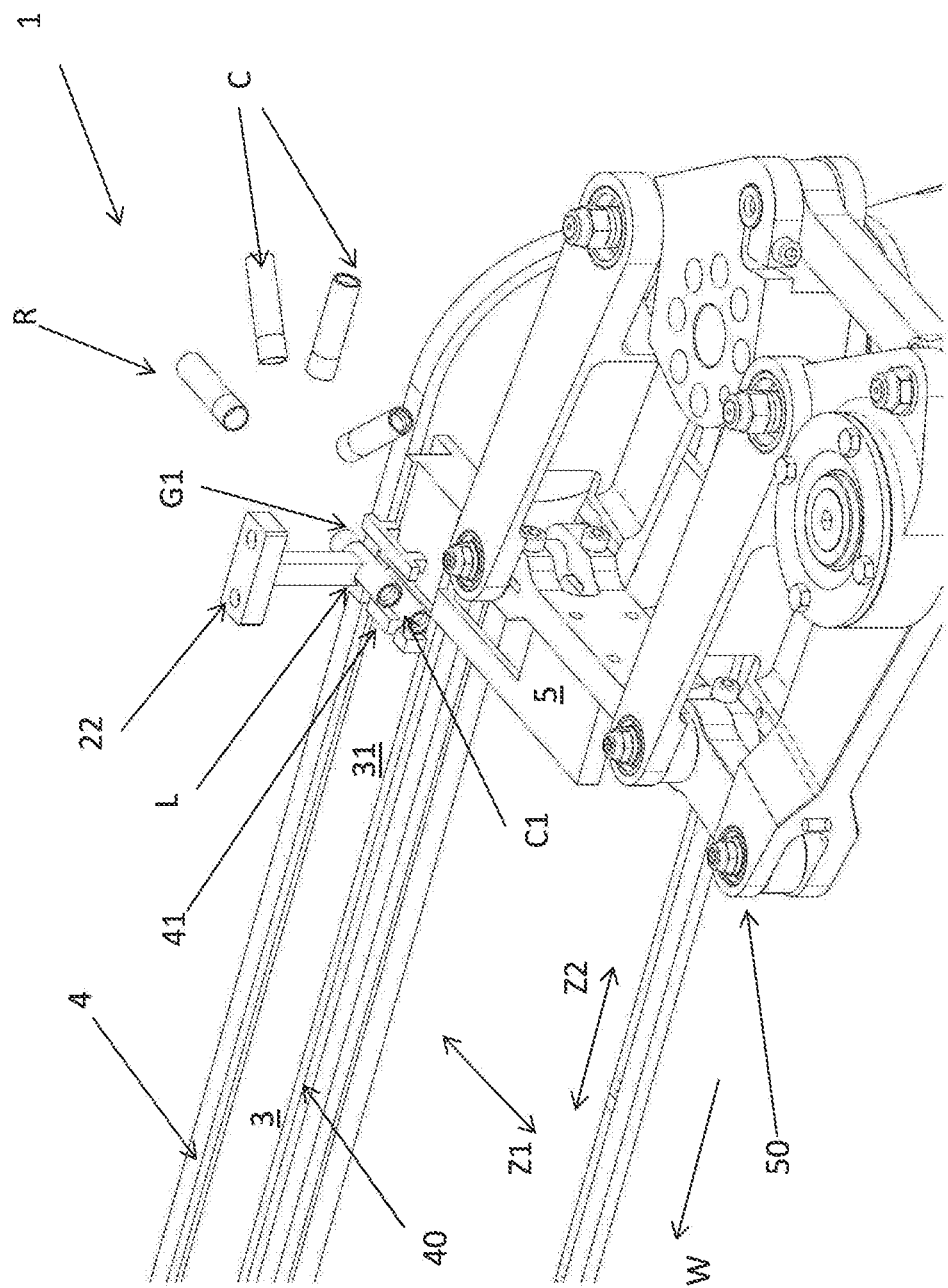
Figure 6:
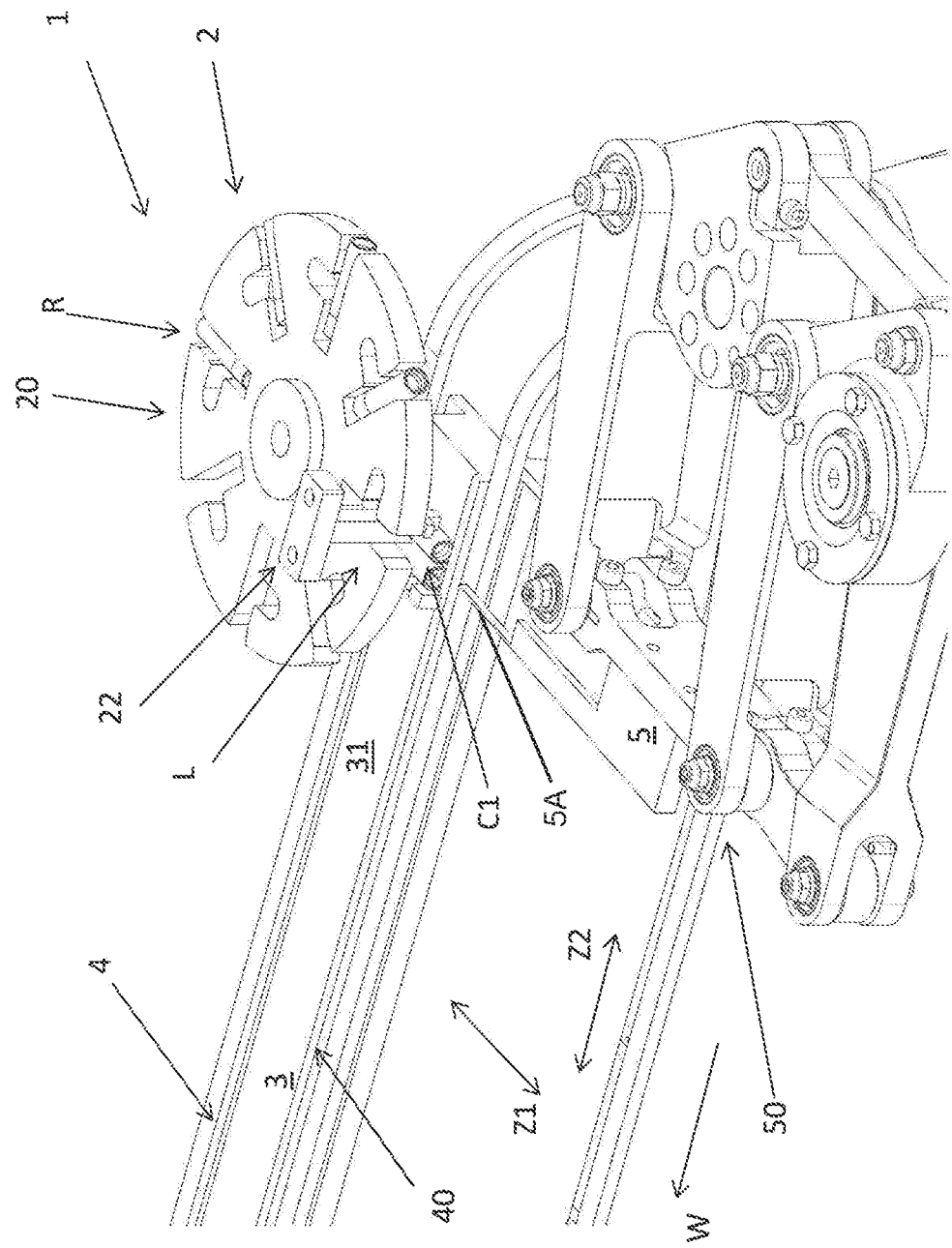
FIG. 6 and FIG. 7 are views like those of FIG. 2 and FIG. 3, respectively, but in a fourth operating situation.
Figure 7:
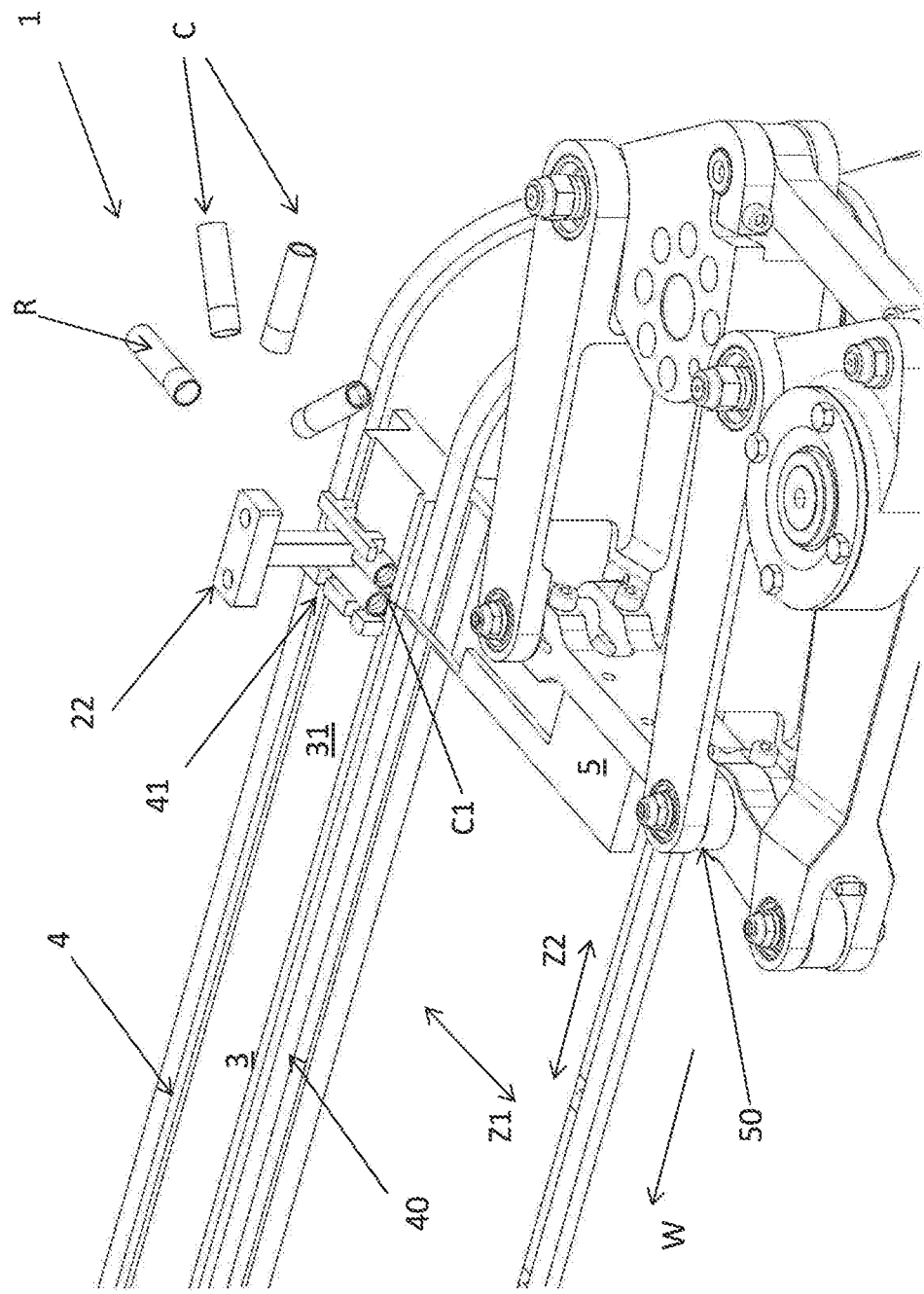
Figure 8:
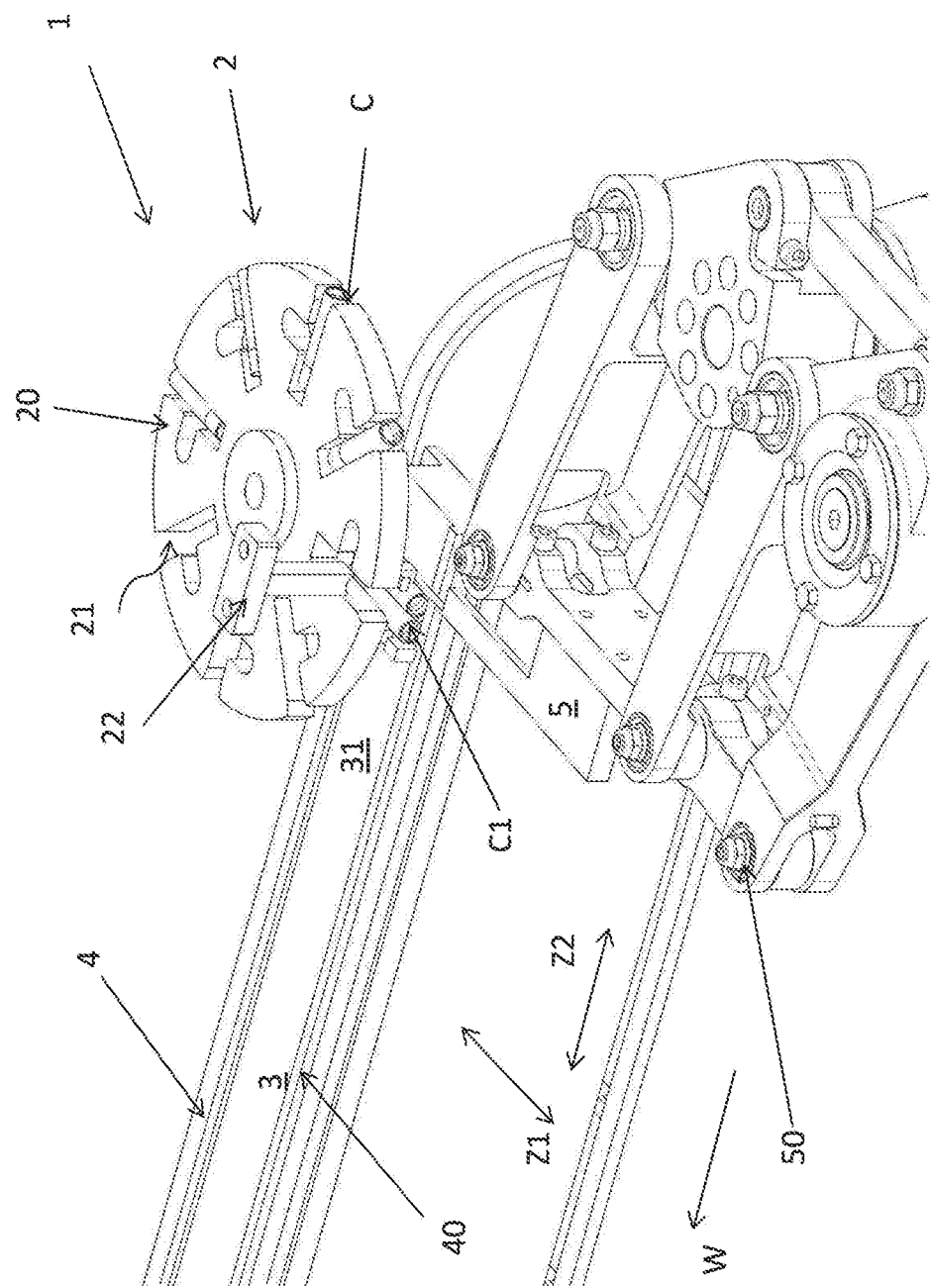
FIG. 8 and FIG. 9 are views like those of FIG. 2 and FIG. 3, respectively, but in a fifth operating situation.
Figure 9:
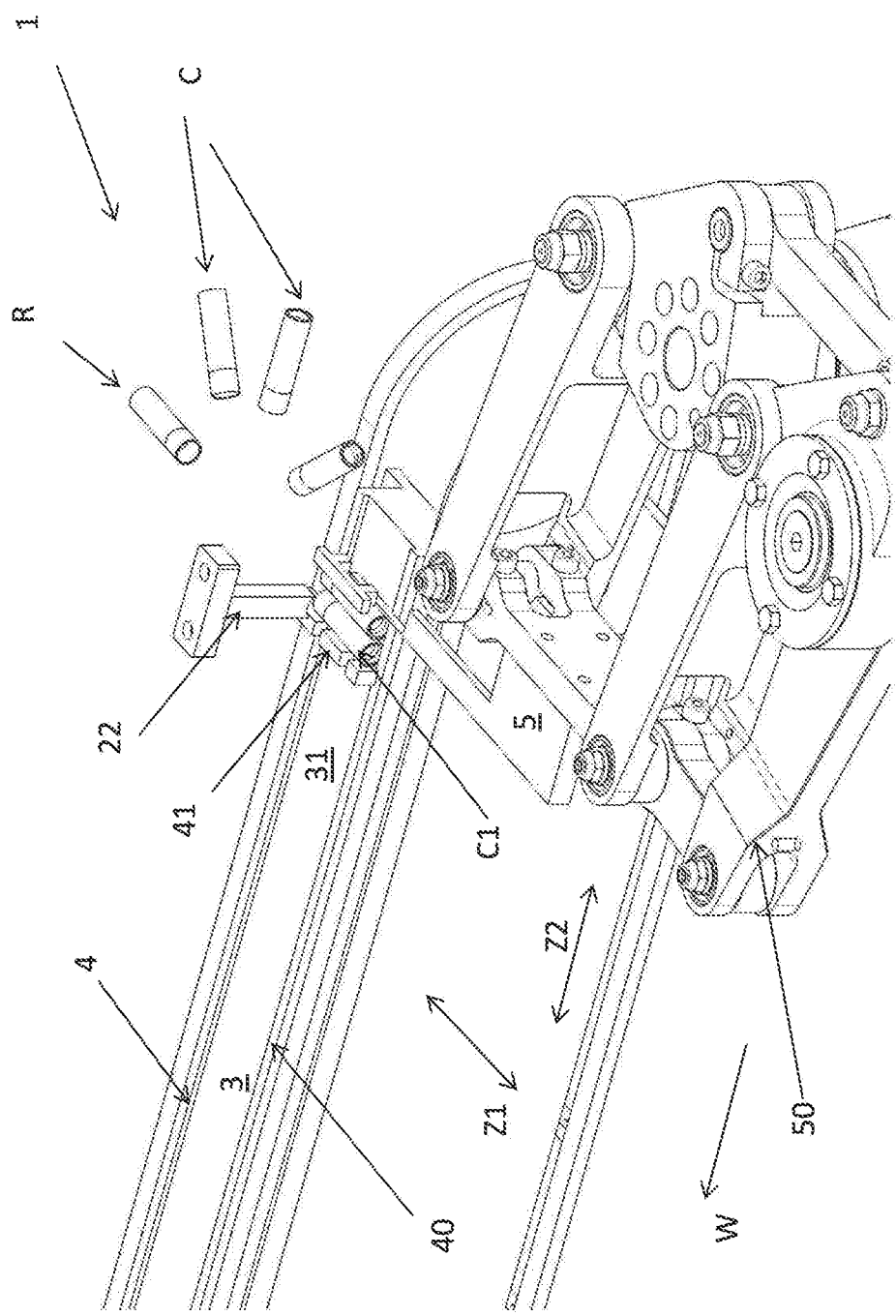
Figure 10:
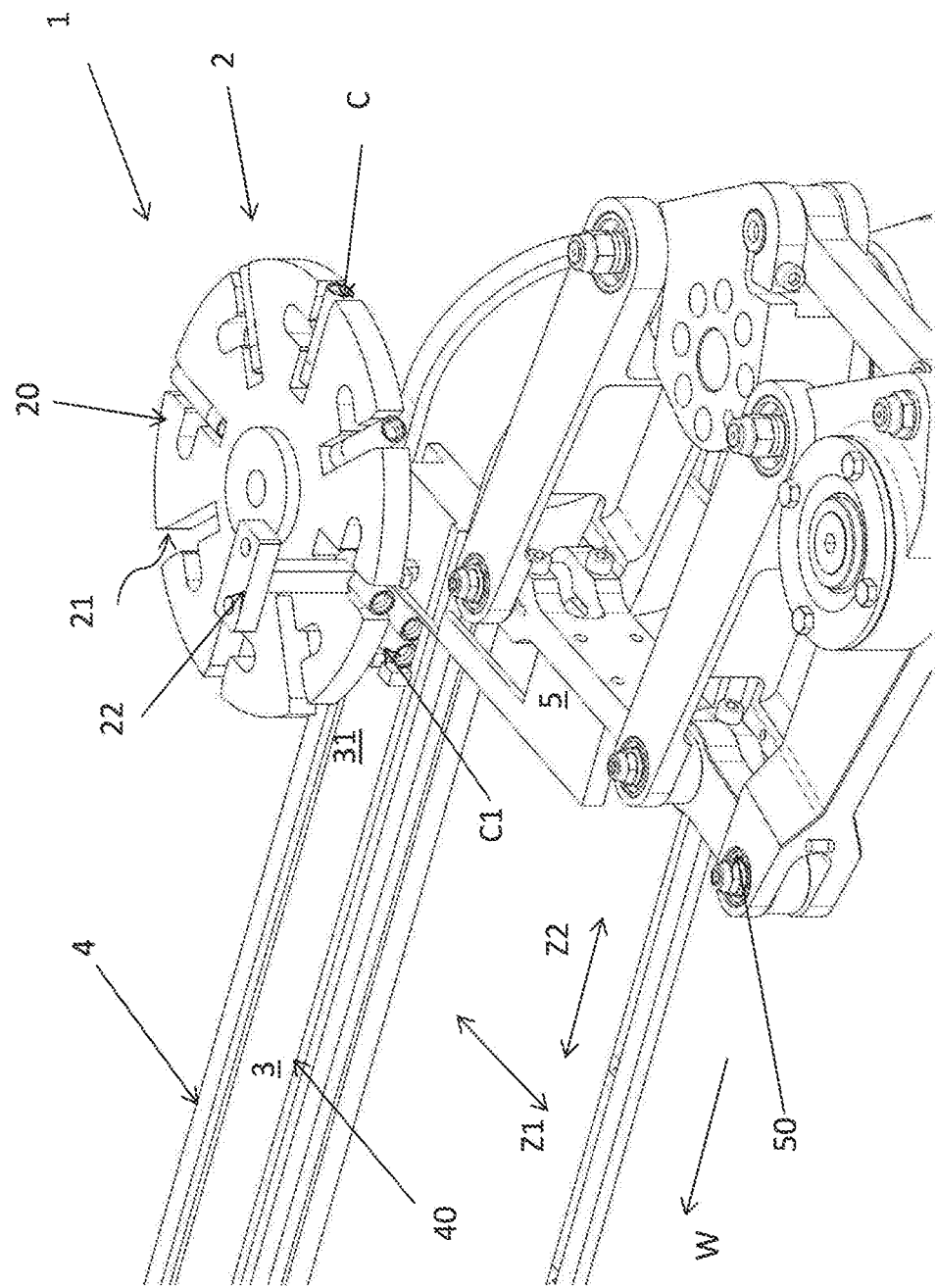
FIG. 10 and FIG. 11 are views like those of FIG. 2 and FIG. 3, respectively, but in a sixth operating situation.
Figure 11:
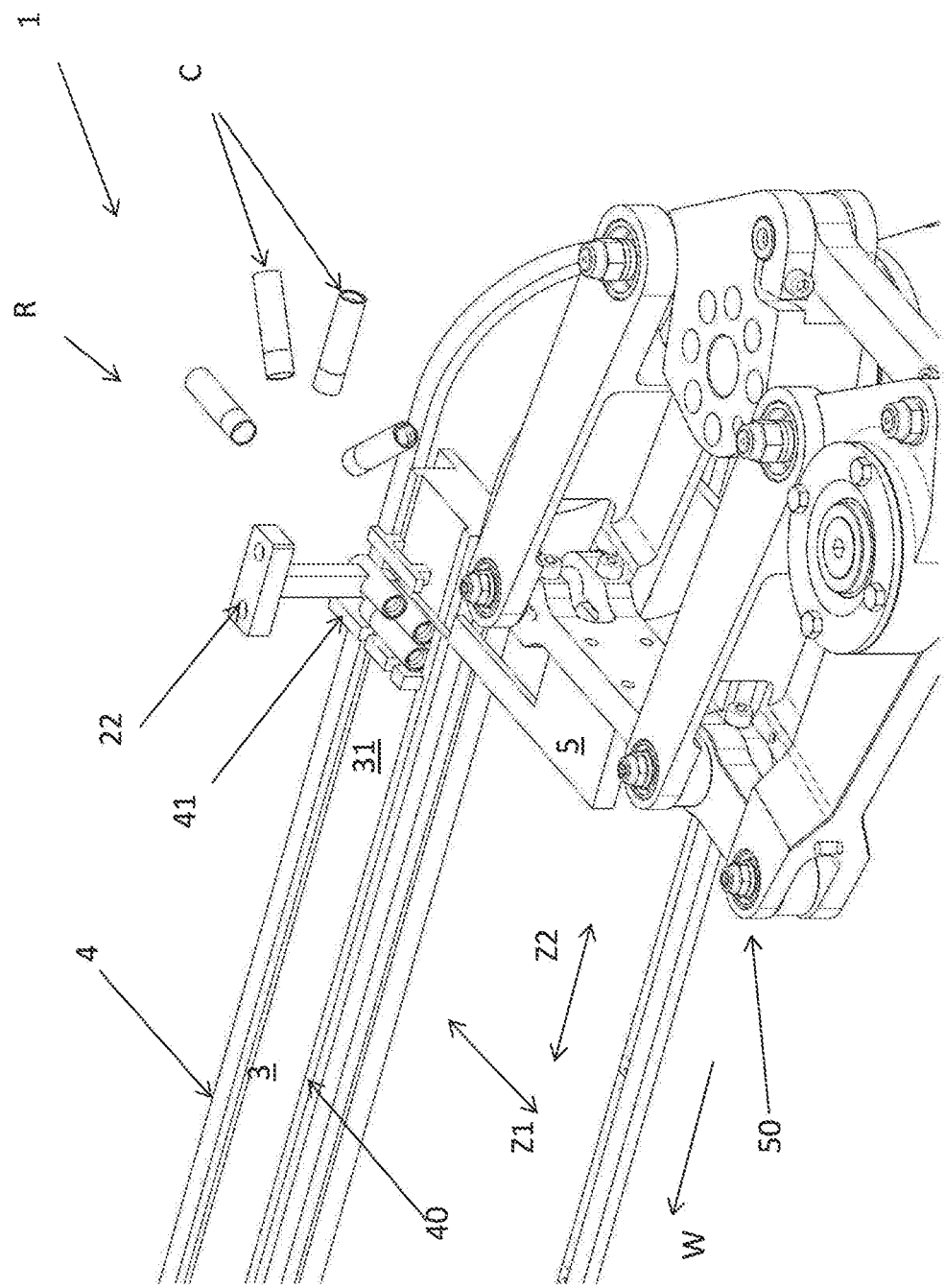

The system 1 also comprises: a first abutment element 41 (see FIGS. 2, 3 and 5, for example) disposed on the flat collecting surface 3, between the releasing zone 32 and the feeding zone 31, to abut the first component C1 of the first group G1 of components that is released into the feeding zone 31 (by the feed device 2).

The system 1 also comprises: a second abutment element 42 (shown in FIG. 1) disposed to abut the last component C2 of the first group G1 of components C released onto the flat collecting surface 3 by the feed device 2; and compacting and stabilizing means 5, 50 (see FIGS. 2-11) operating in the feeding zone 31 to move the components C closer to each other while they are being fed into the feeding zone 31, in such a way as to dispose them at a second mutual distance, smaller than the first mutual distance, between the first abutment element 41 and the second abutment element 42. The compacting and stabilizing means 5, 50 stabilize the position of the components fed onto the surface 3, preventing unwanted movement, as explained in more detail below.

The system 1 further comprises first movement means 4 for moving the first abutment element 41 and the second abutment element 42 in a conveying direction W (parallel to the longitudinal direction of extension of the flat collecting surface 3) along the flat collecting surface 3 (see FIG. 1, for example). More in detail, the first abutment element 41 and the second abutment element 42 are configured to transfer the first group G1 of components C from the feeding zone 31 to the releasing zone 32 while they are being moved (see FIGS. 1-11, for example).

The system 1 also comprises: a tray 6 disposed to face the releasing zone 32 to receive the first group G1 of components C from the releasing zone 32; and pushing means 7 (pushing bar), operating in the releasing zone 32 to push the components C from the collecting zone 32 into the tray 6. Preferably, the pushing direction T of the pushing means 7 is at right angles to the conveying direction W (see FIGS. 12 and 12A). The tray 6, when disposed to receive the components C, is oriented vertically (again, see FIGS. 12 and 12a in particular).

Figure 13D:
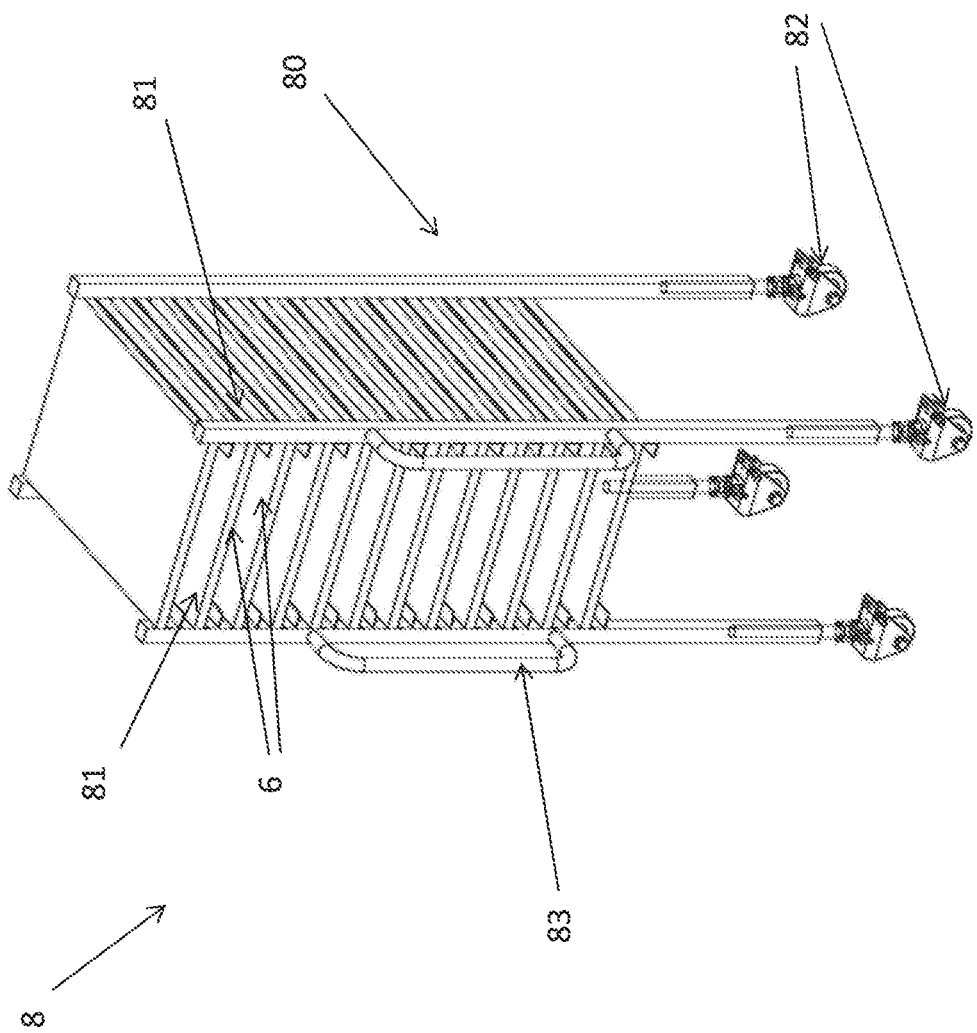
FIG. 13D is an enlarged, perspective view of another part of the system according to the invention.
Figure 14B:
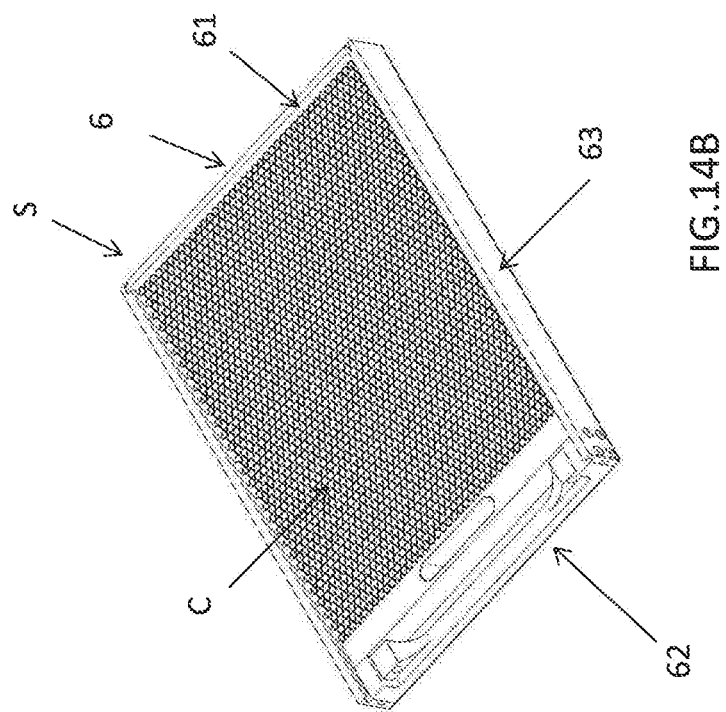
FIGS. 14A-14D are enlarged, perspective views of a detail of the system according to the invention in four different operating situations.
Figure 14A:
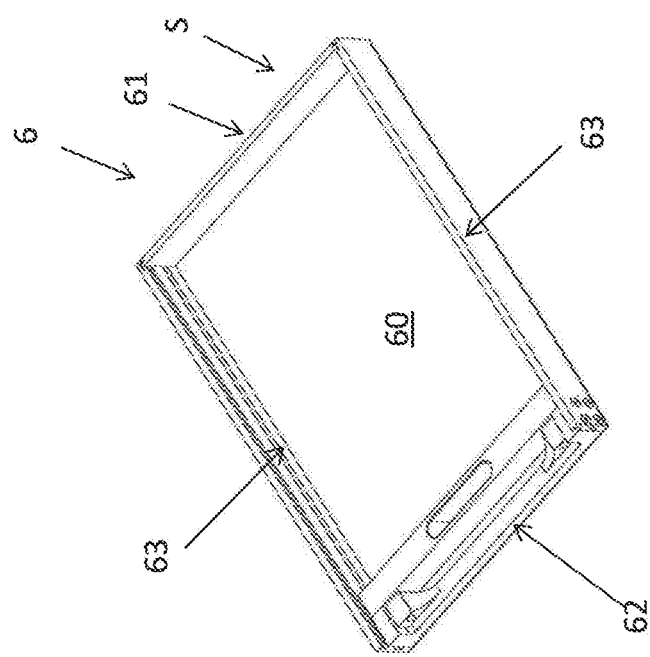
Figure 14D:
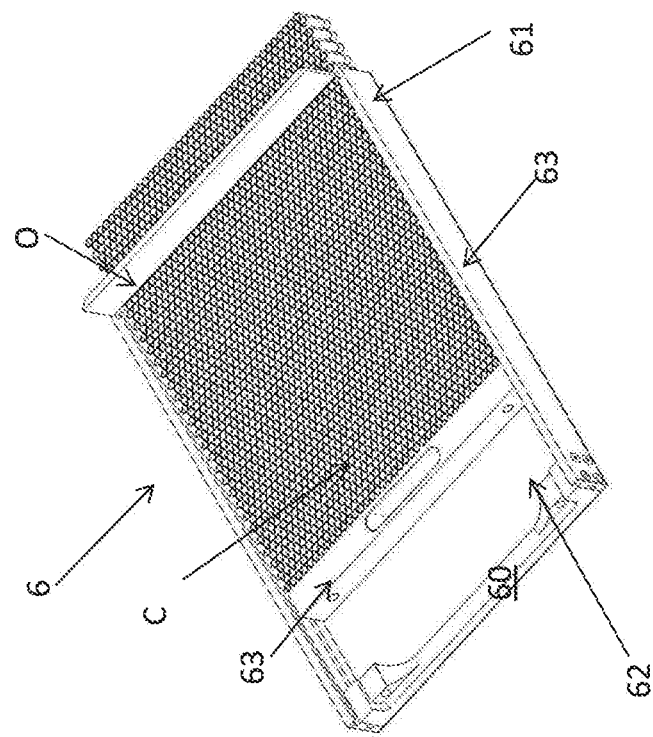
Figure 14C:
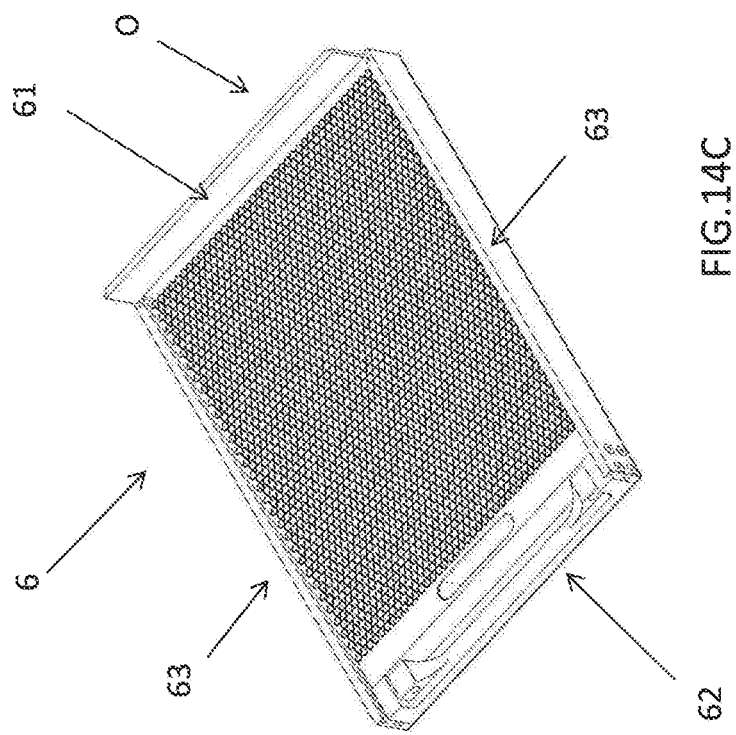

The system 1 also comprises transferring means 8 for transferring the tray 6 filled at least with a first group G1 of components C towards the second operating station (see FIG. 13D).

Advantageously, compared to prior art systems, the system 1 guarantees controlled transfer of all the components C of any shape.

As shown in the accompanying drawings, in particular in FIG. 1, the first abutment element 41 and the second abutment element 42 are transverse to the conveying direction W, extending in particular at right angles to the conveying direction W. This allows the first abutment element 41 and the second abutment element 42 to hold the first group G1 of components C and to transfer it from the feeding zone 31 to the releasing zone 32 while it is being moved.

Preferably, the distance between the first abutment element 41 and the second abutment element 42 is equal to the distance between the first component C1 and the last component C2, with all the components C in contact with each other.

As already stated, the compacting and stabilizing means 5, 50 operate to move the components C closer to each other (by moving them towards the first abutment element 41) while they are being fed into the feeding zone 31 in such a way as to dispose them at a second mutual distance, smaller than the first mutual distance, between the first abutment element 41 and the second abutment element 42. Preferably, as mentioned above, when the components C are positioned at the second mutual distance, they are in contact with each other, that is to say, the second mutual distance is the minimum distance between one component and another.

Considering the case where the components C are electronic cigarette cartridges with circular cross section, as in the accompanying drawings, the compacting and stabilizing means 5, 50 are even more advantageous because they prevent the components C fed onto the flat collecting surface 3 and moved close to each other from rolling backwards uncontrollably (on account of their circular cross section) and the components C fed in after them are therefore not obstructed.

For example, the first movement means 4 comprise at least a first conveyor 4 (e.g. an endless belt) disposed alongside the flat collecting surface 3; the first conveyor 4 extends along a direction parallel to the longitudinal direction of extension of the flat collecting surface 3 and is movable from the feeding zone 31 to the releasing zone 32. Preferably, the first conveyor 4 is adjacent and parallel to the flat collecting surface 3 (see FIGS. 1-3 by way of example).

In detail, the first abutment element 41 and the second abutment element 42 are mounted to the first conveyor 4 in cantilever fashion to protrude onto the flat collecting surface 3. In the case illustrated, where the first conveyor is an endless belt, the first abutment element 41 is downstream of the second abutment element 42.

In the preferred embodiment, therefore, the first abutment element 41 and the second abutment element 42 are connected to one another (since they are both mounted to the same movement means 4) but they might also be moved independently of each other, that is to say, they might be unconnected.

In the preferred embodiment, the first abutment element 41 and the second abutment element 42 mounted to the first conveyor 4 travel: along a first stretch, proximal to the feeding zone 31, where the first conveyor 4 moves step by step towards the releasing zone 32 until all the components C of the first group G1 of components C are on the flat collecting surface 3, between the first abutment element 41 and the second abutment element 42; and a second stretch (alongside and adjacent to the first stretch, downstream thereof in the conveying direction W) where the first conveyor 4 moves continuously towards the releasing zone 32 after all the components C of the first group G1 have been fed into the feeding zone 31, on the flat collecting surface 3, in order to convey them to the releasing zone 32.

Thus, advantageously, the speed of the first conveyor 4 can increase when all the components C of the first group G1 of components C are disposed between the first abutment element 41 and the second abutment element 42, freeing the feeding zone 31 of the flat collecting surface 3 to quickly enable other components C to be fed in. Clearly, there is more than one first abutment element 41 and more than one second abutment element 42, suitably mounted on the first conveyor 4.

With reference in particular to FIGS. 2-11, the feeding device 2 receives the components C disposed horizontally from the first operating station and feeds the components C disposed horizontally onto the flat collecting surface 3. Unlike prior art solutions, this aspect avoids the need for orienting devices which would complicate the structure of the system 1.

Preferably, the feeding device 2 receives the components C with a first orientation from the first operating station and feeds the components C onto the flat collecting surface 3 with a second orientation, turned 180° with respect to the first orientation.

With reference to FIGS. 2, 4, 6, 8, 10, the feeding device 2 comprises: a rotary element 20 provided with seats 21, each of which is adapted to receive a component C from the first operating station and to hold the component; the rotary element 20 being rotatable about its axis to transfer the components C into its seats 21 from a receiving angular position R, at which the components C are received into the seats 21, to a release angular position L. The feeding device 2 also comprises a release device 22, operating on the components C in the seats 21 when the components C are at the release angular position L, allowing the components C to be released from the seats 21 of the feeding device 2 onto the flat collecting surface 3.

In another embodiment, not illustrated and alternative to the one just described, the feeding device further comprises suction means which are connected to the seats of the rotary element and which can be switched on to hold the components by suction and off when each seat reaches the release angular position to release the components into the seats of the conveyor.

Preferably, the compacting and stabilizing means 5, 50 comprise a compacting element 5 (see FIGS. 2-11) which extends mainly longitudinally and which is movable: in a first direction Z1 perpendicular to the conveying direction W to be inserted between a component C fed onto the flat collecting surface 3 and the second abutment element 42; and in a second direction Z2 parallel to the conveying direction W, in order to move that component C closer to the first abutment element 41 (or to another component C which has been fed previously. Clearly, the compacting element 5 is movable both ways along the first and second directions, Z1, Z2, that is, also along the first direction Z1 away from the flat collecting surface 3 and along the second direction Z2 away from the first abutment element 41.

With reference to the aforementioned drawings, the compacting and stabilizing means 5, 50 further comprise a drive mechanism 50 which mounts the compacting element 5 and which comprises a four-bar cam mechanism 50, allowing the compacting element 5 to be moved at least in the first direction Z1 and in the second direction Z2. The cams advantageously allow the compacting element 5 to perform the movement described above.

Preferably, the system 1 further comprises a third abutment element (not visible in the accompanying drawings) which is disposed to abut the first component C1 of a second group G2 of components C which is released onto the flat collecting surface 3 in the feeding zone 31, when the first abutment element 41 and the second abutment element 42 have been moved into the releasing zone 32 (taking the first group G1 of components C with them); and a fourth abutment element (also not visible in the accompanying drawings) which is disposed to abut the last component C2 of the second group G2 of components C which is released onto the flat collecting surface 3 by the feeding device 2, when the first abutment element 41 and the second abutment element 42 have been moved into the releasing zone 32 (taking the first group G1 of components C with them). The third abutment element and the fourth abutment element are preferably shaped like the first abutment element 41 and the second abutment element 42 and what has been stated regarding the first abutment element 41 and the second abutment element 42 also applies to the third abutment element and to the fourth abutment element.

In the embodiment described above, the system 1 also comprises second movement means 40 connected to the third abutment element and to the fourth abutment element to move these two abutment elements in the conveying direction W along the flat collecting surface 3 so as to transfer the second group G2 of components C from the feeding zone 31 to the releasing zone 32.

Preferably, the second movement means 40 comprise a second conveyor 40, disposed alongside the flat collecting surface 3 on the side opposite to the first conveyor 4, extending along a direction parallel to the direction of extension of the flat collecting surface 3 and movable from the feeding zone 31 to the releasing zone 32; the third abutment element and the fourth abutment element are mounted to the second conveyor 40 in cantilever fashion in such a way as to protrude onto the flat collecting surface 3.

In the preferred embodiment, all the features described above with reference to the first conveyor 4 also apply to the second conveyor 40 (that is, the features relating to structure, position, stepwise or continuous feed modes, etc.).

Figure 12:
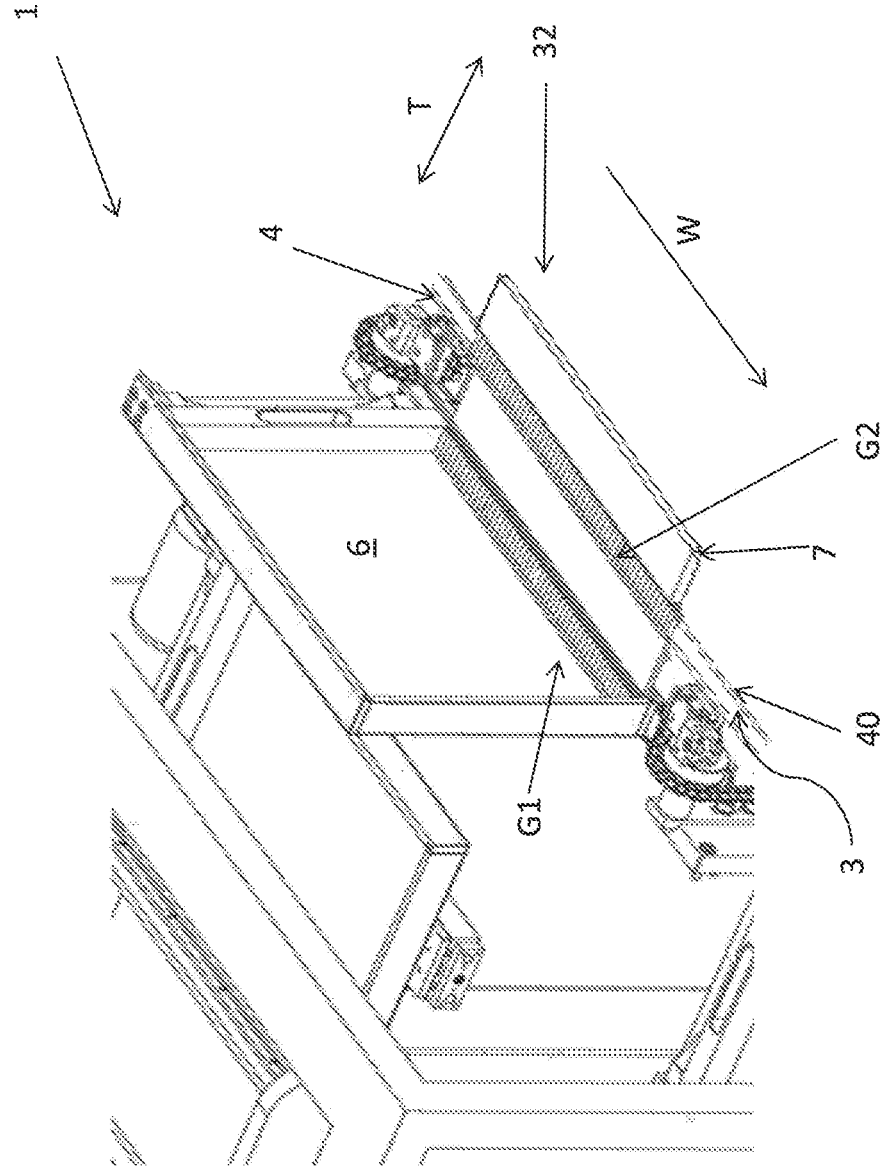
FIG. 12 is a perspective view of another part of the system according to the invention.
Figure 12A:
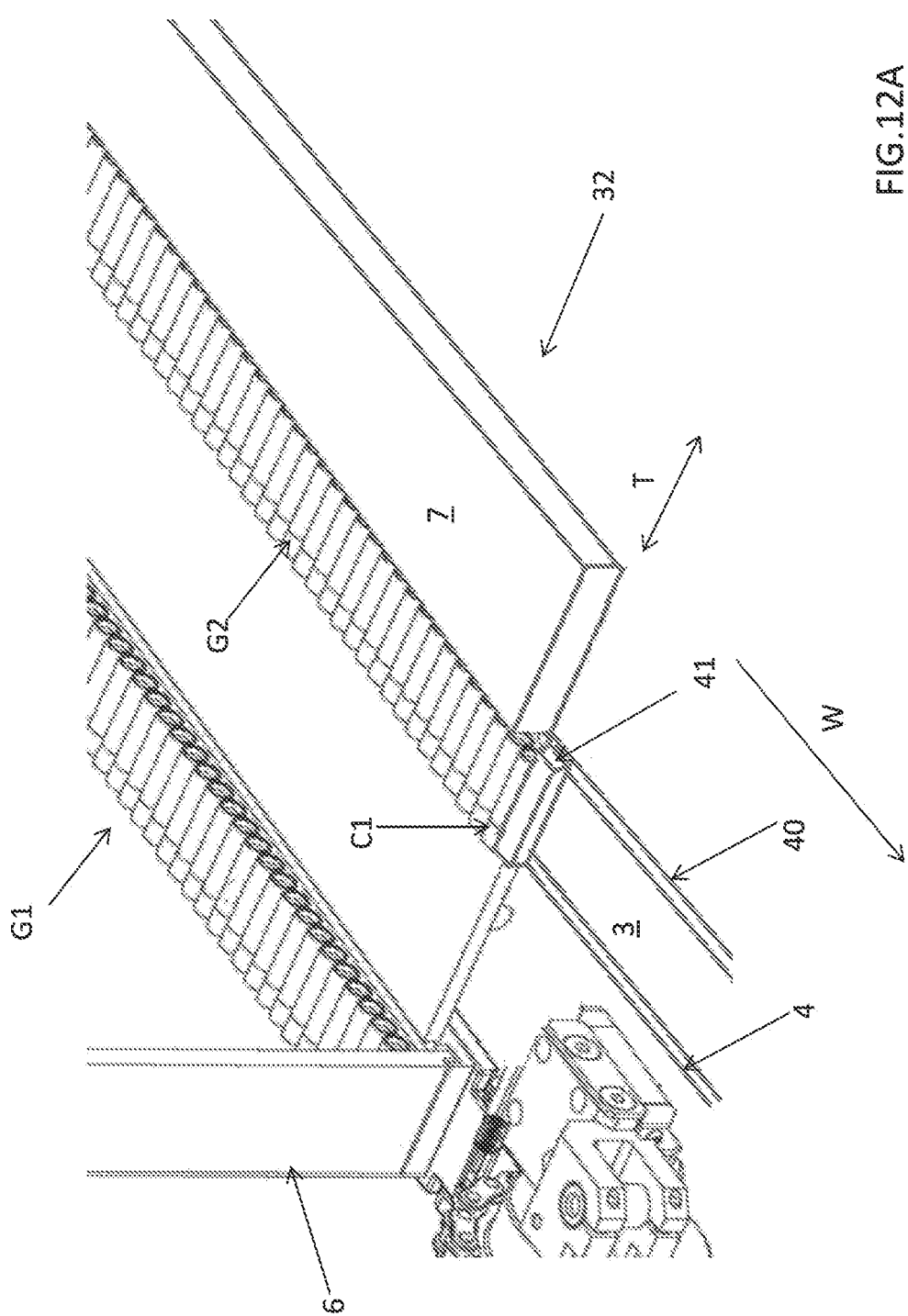
FIG. 12A is an enlargement of a detail from FIG. 12.

When the first group G1 of components C reaches the releasing zone 32, the pushing means 7 are activated and push the components C out of the releasing zone 32 and into the tray 6 (see FIGS. 12 and 12A, where the pushing means 7 are represented in an exemplary, non-limiting way). More specifically, in the case where the components C are cylindrical electronic cigarette cartridges or other components or electronic cigarettes with circular cross section, as in the case illustrated, the pushing means 7 push the cartridges into the tray 6 in a direction perpendicular to the rolling direction of the cartridges, that is, parallel to the extension of the cartridges themselves. This aspect allows greater control over the movement of the components C from the releasing zone 32 to the tray 6. Clearly, unlike prior art systems, the system 1 is configured to also transfer components C which are not circular in cross section.

As mentioned above, the tray 6 is positioned vertically when it receives the group of components C (see FIGS. 12 and 12A). Once the tray 6 has been filled with at least one group G of components C, it is turned to a horizontal position and then moved to the second operating station by the transferring means 8.

To turn the tray 6 from the horizontal position it is in when it is filled with the components C to the horizontal position, the system 1 comprises a tilting unit 9 (see detail shown in FIGS. 13A-13C, which show three distinct, successive steps of tilting the tray 6).

In the embodiment illustrated, the tilting unit 9 comprises: supporting means 90 (shown in FIG. 13A) for supporting the tray 6 while it is being moved, which support the outside of the tray 6 and which are rotatable about an axis K to enable the tray 6 to be moved; hooking means 900—for example, grippers in the embodiment illustrated—which are connected to the supporting means 90 and which can be hooked onto the tray 6 from both sides in order to steady it while it is being tilted; and a motor M which turns the supporting means 90 between two angular end positions about the axis K: one where the tray 6 is positioned vertically (as in FIG. 12) and the other where the tray 6 is positioned horizontally (as in FIG. 13C).

Once positioned horizontally, the tray can be transported to the second operating station by the transferring means 8.

In detail, the transferring means 8 (illustrated in FIG. 13D) comprise a supporting structure 80 which is positioned vertically (when in use or ready for use) and a plurality of horizontal supporting elements 81, each of which can receive a tray 6 positioned horizontally. With reference to the drawings, the supporting elements 81 are, for example, longitudinal guides placed opposite each other in pairs (or they may be shelves) fixed to the supporting structure 80 to receive opposite sides of a tray 6.

The supporting elements 81 are aligned vertically along the supporting structure 80 spaced far enough apart to allow a plurality of trays 6 to be placed above one another.

The supporting structure 80 may also comprise a plurality of wheels 82, to facilitate movement, and at least one handgrip 83.

The transferring means 8 are substantially embodied in the form of a trolley.

Once a tray 6—preferably a plurality of trays 6—has been placed horizontally in the supporting structure 80, an operator can transport it to the second operating station, where the components C are emptied out of the trays.

With reference to FIGS. 14A-14D in particular, the tray 6 comprises a bottom 60, a front wall 61, a rear wall 62 opposite to the front wall 61 and two side walls opposite to each other. More specifically, to facilitate emptying the components C out of the tray 6, the front wall 61 is movable between at least one closed configuration S (shown in FIGS. 14A and 14B), where the components C are prevented from coming out, and an open configuration O (shown in FIGS.

14C and 14D), where the components C are allowed to come out. The front wall 61 is, for example, connected to the side walls by a bayonet coupling.

Further, the rear wall 62 is movable (at least partly) towards the front wall 61 in such a way as to push the components C out of the tray 6 when the front wall 61 is in the open configuration O.

Preferably, the front wall 61 is slidable between the two side walls 63 away from the bottom 60 and the rear wall 62 is slidable (at least partly) between the two side walls towards the front wall 61.

The bottom 60 is preferably very reduced in thickness so as to limit the height of the "jump"—that is, the difference in height—which the components must take as they move out of the tray 6 onto the supporting surface or onto the conveyor belt.

Described below for greater clarity is the operation of the system 1 in its entirety, with reference to the preferred embodiment illustrated in the accompanying drawings.

A first group G1 of components C (cartridges) is transferred from the first operating station (for example, an automatic assembly station, not illustrated) into the seats of the feeding device 2 which, as described above, feeds the individual components C onto the flat collecting surface 3, where the components C are at the first mutual distance from each other.

The first component C1 of the first group G1 of components fed onto the flat collecting surface 3 is abutted by the compacting element 5 which is disposed between the first component C1 and the second abutment element 42 (as a result of the movement in the first direction Z1). The first component C1 is brought into contact with the first abutment element 41 following movement of the compacting element 5 in the second direction Z2. At the same time, the first conveyor 4 moves one step forward in the conveying direction W towards the releasing zone 32, while a second component C is fed onto the flat collecting surface 3 by the feeding device 2. The compacting element 5, which was up to now in contact with the first component C1, is moved by the respective drive mechanism 50 to free the preceding position (direction Z1) and, using pushing surface 5A (see FIG. 6), to push the second component into contact with the first component C1 (direction Z2) downstream along the conveying direction W.

These operations are repeated until all the components C of the first group G1 are disposed between the first abutment element 41 and the second abutment element 42.

Clearly, one group G1, G2 of components C corresponds to a "row" received successively in the tray 6.

The first conveyor 4 is then moved continuously along the conveying direction W, causing the first group G1 of components C to be transferred into the releasing zone 32.

In the meantime, the second conveyor 40 is moved forward in such a way that the third abutment element can come into abutment against the first component C1 of the second group G2 of components C and the fourth abutment element can come into abutment against the last component C2 of the second group G2 of components C.

Returning now to the releasing zone 32, where the first group G1 of components C is disposed, the pushing means 7 are driven to push the first group G1 of components C into the tray 6, in a direction perpendicular to the conveying direction W. The tray 6 moves stepwise vertically, from the top down, each time it receives a group (that is, a "row") of components C, until it is full (or contains a predetermined number of components C). It is then, as described above, turned to the horizontal position by the tilting device 9 and placed in the supporting structure 80 (that is, in the transferring means 8). More specifically, each time a tray 6 is placed in the supporting structure 80, it occupies the free position nearest the floor.

When the supporting structure 80 is full or contains a predetermined number of trays 6, it is taken by an operator to the second operating station.

Next, each tray 6 is removed from the supporting structure 80 and placed on a flat surface, preferably on a conveyor belt (not illustrated) feeding into the second operating station. Here, the operator unloads the components C, by first moving the front wall 61 to the open configuration O and then gripping the rear wall 62, which is pushed towards the front wall 61 to feed the components C out of the tray 6, as described above.

The invention claimed is:

1. A system for transferring a first group of components of electronic cigarettes from a first operating station to a second operating station, the system comprising:
    a flat collecting surface extending along a longitudinal direction from a feeding zone to a releasing zone;
    a feeding device that includes at least one seat for receiving components of the first group of components from the first operating station one by one and feeding the component one by one onto the flat collecting surface in the feeding zone at a first mutual distance from each other;
    a first abutment element disposed on the flat collecting surface to abut a first component of the first group of components that is released onto the flat collecting surface;
    a second abutment element disposed on the flat collecting surface for abutting a last component of the first group of components that is released on the flat collecting surface;
    a compacting and stabilizing device including a pushing surface operating at the feeding zone to move the components closer to each other while the components are being fed in such a way as to dispose the components at a second mutual distance from each other, smaller than the first mutual distance, between the first abutment element and the second abutment element;
    a first movement conveyor, for moving the first abutment element and the second abutment element in a conveying direction along the flat collecting surface; the first abutment element and the second abutment element being configured to transfer the first group of components from the feeding zone to the releasing zone while they are being moved;
    a tray facing the releasing zone for receiving the first group of components;
    a pushing bar, operating in the releasing zone for pushing the first group of components into the tray;
    a transfer trolley, for transferring the tray including at least the first group of components towards the second operating station.

2. The system according to claim 1, wherein the first movement conveyor comprises a first conveyor, disposed alongside the flat collecting surface; the first conveyor extending along a direction parallel to the longitudinal direction of extension of the flat collecting surface and being movable from the feeding zone to the releasing zone;
    the first abutment element and the second abutment element being mounted to the first conveyor in a cantilever manner to protrude onto the flat collecting surface.

3. The system according to claim 2, wherein the first abutment element and the second abutment element mounted to the first conveyor travel along a first stretch where the first conveyor moves step by step towards the releasing zone until all the components of the first group are on the flat collecting surface, between the first abutment element and the second abutment element; and a second stretch where the first conveyor moves continuously towards the releasing zone after all the components of the first group have been fed into the feeding zone, in order to convey the components of the first group to the releasing zone.

4. The system according to claim 1, wherein the compacting and stabilizing device comprises a compacting element which includes the pushing surface, the compacting element being movable in a first direction perpendicular to the conveying direction to be inserted between one of the components fed onto the flat collecting surface and the second abutment element; and in a second direction parallel to the conveying direction, in order to move the one of the components closer to the first abutment element in such a way that two adjacent ones of the components are at the second mutual distance.

5. The system according to claim 4, wherein the compacting and stabilizing device further comprises a drive mechanism which mounts the compacting element and which comprises a four-bar cam mechanism, configured for moving the compacting element in the first direction and in the second direction.

6. The system according to claim 1, wherein the feeding device is configured to receive the components, disposed horizontally, from the first operating station and to feed the components disposed horizontally onto the flat collecting surface.

7. The system according to claim 1, wherein the feeding device is configured to receive the components with a first orientation from the first operating station and to feed the components onto the flat collecting surface with a second orientation, turned 180° with respect to the first orientation.

8. The system according to claim 1, wherein the feeding device further comprises:
   wherein the at least one seat includes a plurality of seats;
   a rotary element including the plurality of seats each of which is shaped to receive and hold one of the components from the first operating station; the rotary element being rotatable about an axis thereof to transfer the components into the seats from a receiving angular position, at which the components are received into the plurality of seats, to a release angular position; and
   a release device, operating on the components in the plurality of seats when the components are at the release angular position, configured for releasing the components from the plurality of seats of the feeding device onto the flat collecting surface.

9. The system according to claim 1, further comprising:
   a third abutment element disposed on the flat collecting surface to abut a first component of a second group of components which is released onto the flat collecting surface when the first abutment element and the second abutment element have been moved into the releasing zone;
   a fourth abutment element disposed on the flat collecting surface to abut a last component of the second group of components which is released onto the flat collecting surface by the feeding device when the first abutment element and the second abutment element have been moved into the releasing zone; and
   a second movement conveyor connected to the third abutment element and to the fourth abutment element to move the third and fourth abutment elements in the conveying direction along the flat collecting surface so as to transfer the second group of components from the feeding zone to the releasing zone; the third abutment element and the fourth abutment element being configured to transfer the second group of components from the feeding zone to the releasing zone while the second group of components are being moved.

10. The system according to claim 9, wherein the second movement conveyor comprises a second conveyor, disposed alongside the flat collecting surface on a side opposite to a first conveyor of the first movement conveyor, extending along a direction parallel to the longitudinal direction and being movable from the feeding zone to the releasing zone;
   the third abutment element and the fourth abutment element being mounted to the second conveyor in a cantilever manner in such a way as to protrude onto the flat collecting surface.

11. The system according to claim 1,
   wherein the tray comprises a bottom, a front wall, a rear wall opposite to the front wall and two side walls opposite to each other;
   wherein the front wall is movable between at least one closed configuration, where the components are prevented from coming out of the tray, and an open configuration, where the components are allowed to come out of the tray;
   and wherein the rear wall is movable towards the front wall in such a way as to push the components out of the tray when the front wall is in the open configuration.

* * * * *